(12) United States Patent
Wonnacott et al.

(10) Patent No.: US 12,715,395 B2
(45) Date of Patent: Aug. 25, 2026

(54) VEHICLE PROGRAM FLOW MONITORING

(71) Applicant: Ford Global Technologies, LLC, Dearborn, MI (US)

(72) Inventors: Dereck Wonnacott, Auburn Hills, MI (US); Chad Haase, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 18/746,589

(22) Filed: Jun. 18, 2024

(65) Prior Publication Data

US 2025/0381932 A1 Dec. 18, 2025

(51) Int. Cl.

| | |
|---|---|
| ***B60R 25/20*** | (2013.01) |
| ***B60R 25/04*** | (2013.01) |
| ***G06F 21/33*** | (2013.01) |
| ***G06F 21/44*** | (2013.01) |
| ***H04L 9/40*** | (2022.01) |

(52) U.S. Cl.

CPC .............. *B60R 25/20* (2013.01); *B60R 25/04* (2013.01); *G06F 21/33* (2013.01); *G06F 21/44* (2013.01); *H04L 63/0435* (2013.01); *H04L 63/0807* (2013.01); *B60R 2025/0415* (2013.01); *G06F 2221/2137* (2013.01); *G06F 2221/2151* (2013.01); *H04L 2463/121* (2013.01)

(58) Field of Classification Search

CPC . B60R 25/20; B60R 25/04; B60R 2025/0415; G06F 21/33; G06F 21/44; G06F 2221/2137; G06F 2221/2151; H04L 63/0435; H04L 63/0807; H04L 2463/121

See application file for complete search history.

(56) References Cited

U.S. PATENT DOCUMENTS

| | | | | |
|---|---|---|---|---|
| 8,291,232 | B2 * | 10/2012 | Lim | H04L 9/007 713/176 |
| 9,264,417 | B2 | 2/2016 | Yu et al. | |
| 10,380,063 | B2 | 8/2019 | Tang et al. | |
| 2016/0085955 | A1 | 3/2016 | Lerner | |
| 2016/0248631 | A1 | 8/2016 | Duchesneau | |
| 2017/0272943 | A1 * | 9/2017 | Valasek | G06F 21/575 |
| 2017/0289141 | A1 | 10/2017 | Lu et al. | |

(Continued)

FOREIGN PATENT DOCUMENTS

| | | | |
|---|---|---|---|
| CN | 108646708 | B | 5/2020 |
| WO | 2022174122 | A1 | 8/2022 |

(Continued)

*Primary Examiner* — Yong Hang Jiang

(74) *Attorney, Agent, or Firm* — Frank A. MacKenzie; Brooks Kushman P.C.

(57) ABSTRACT

Respective initial tokens are generated at a first computer for respective instantiations of respective control paths. The respective control paths include a plurality of tasks arranged in respective sequences. Respective expected signatures of the respective control paths are generated based on the respective initial tokens, the respective sequences, and respective keys for each of the plurality of tasks in the respective control paths. Upon receiving, from a second computer, respective signatures of the respective control paths, the second computer is permitted to operate, via the respective control paths, an object based on the respective expected signatures matching the respective signatures.

20 Claims, 6 Drawing Sheets

(56) References Cited

U.S. PATENT DOCUMENTS

| | | | | |
|---|---|---|---|---|
| 2018/0121272 | A1 | 5/2018 | Kordik | |
| 2018/0194324 | A1* | 7/2018 | Neugebauer | H04L 63/0807 |
| 2018/0322273 | A1* | 11/2018 | Biondo | B60R 16/023 |
| 2019/0354518 | A1 | 11/2019 | Zochowski | |
| 2021/0118251 | A1 | 4/2021 | Binet et al. | |
| 2021/0279099 | A1* | 9/2021 | Boonstoppel | G06F 9/4887 |
| 2022/0158855 | A1 | 5/2022 | Wentz | |
| 2022/0159069 | A1 | 5/2022 | Shirley et al. | |
| 2022/0278844 | A1 | 9/2022 | Youssef | |
| 2023/0183049 | A1* | 6/2023 | Pabla | B66F 9/07581<br>701/50 |
| 2023/0254168 | A1 | 8/2023 | Wright et al. | |

FOREIGN PATENT DOCUMENTS

| | | | |
|---|---|---|---|
| WO | 2022258400 | A1 | 12/2022 |
| WO | 2023043736 | A1 | 3/2023 |

* cited by examiner

VEHICLE PROGRAM FLOW MONITORING

BACKGROUND

Computers can operate systems and/or devices including vehicles, robots, drones, and/or object tracking systems. Data can be acquired by sensors and processed by a computer to determine one or more trajectories of objects and/or the system or components thereof in an environment and to operate the system or components thereof in the environment.

DETAILED DESCRIPTION

Figure 1:
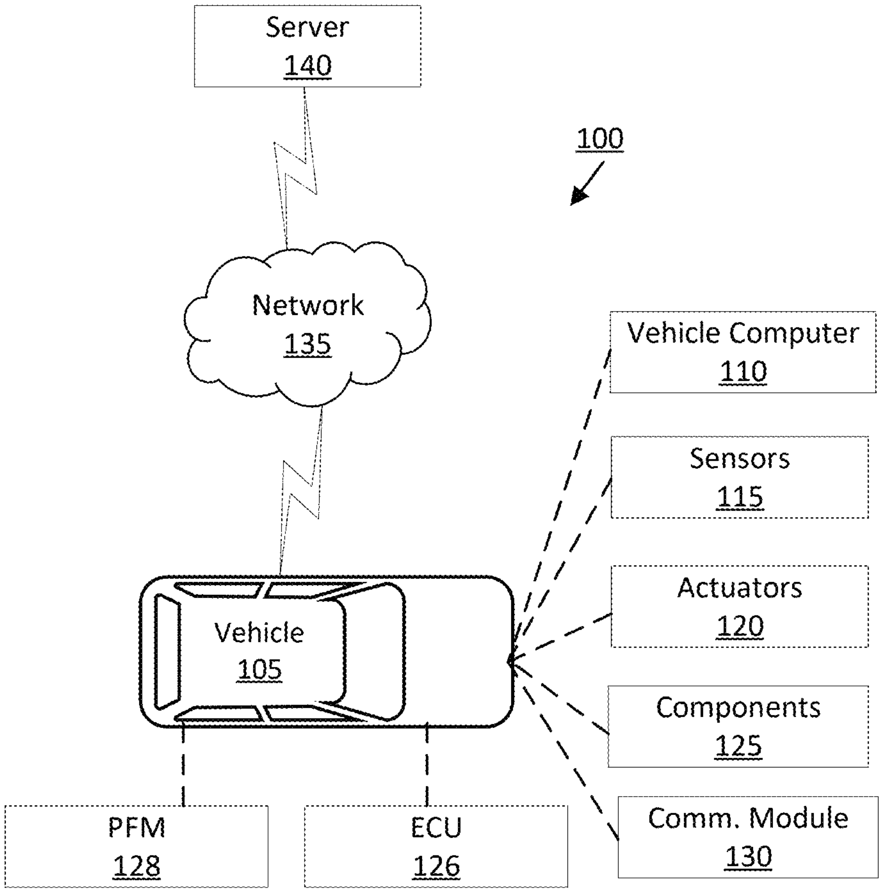
FIG. 1 is a block diagram illustrating an example vehicle control system.

A computer in a system including vehicles, robots, drones, etc., can be programmed to operate the system or components thereof based on acquiring and processing sensor data regarding an environment around the system. As one example, the computer can plan a path upon which to operate a vehicle that accounts for a plurality of objects in the environment and operates the vehicle along the path. As another example, the computer can plan a path upon which to guide a robot arm that accounts for other robot arms in the environment and operates the robot arm along the path to move an end effector for example a gripper, to pick up one part from a plurality of parts and orient the one part for assembly. Vehicle operation will be described herein as a non-limiting example of a computer that operates a system or components thereof in an environment.

A vehicle may include one or more user assist features. A user assist feature is an operation in a vehicle to actuate one or more vehicle components based on data from vehicle sensors and/or components to assist or supplement user operation of the vehicle. For example, the vehicle can be at least partially controlled based on the user assist features. Non-limiting examples of user assist features include park assist, lane-keeping, adaptive cruise control, adaptive braking, path planning, object avoidance, etc. Due to current hardware limitations for electronic control units (ECUs) and performance specifications for ECUs (e.g., as specified by the ASIL (Automotive Safety Integrity Level) classification system), an ECU may lack capabilities to execute a plurality of user assist features while satisfying performance specifications for the ECU. As such, the vehicle may include respective ECUs each programmed to execute respective user assist features. Having respective ECUs to control respective user assist features consumes available packaging space and available computational resources.

A system includes a first computer including a processor and a memory, the memory storing instructions executable by the processor such that the first computer is programmed to generate respective initial tokens for respective instantiations of respective control paths. The respective control paths include a plurality of tasks arranged in respective sequences. The first computer is further programmed to generate respective expected signatures of the respective control paths based on the respective initial tokens, the respective sequences, and respective keys for each of the plurality of tasks in the respective control paths. The first computer is further programmed to, upon receiving, from a second computer, respective signatures of the respective control paths, permit the second computer to operate, via the respective control paths, an object based on the respective expected signatures matching the respective signatures.

The first computer can be further programmed to actuate an object component to stop operation of the object based on the respective expected signature of one of the respective control paths differing from the respective signature of the one of the respective control paths.

The first computer can be further programmed to, upon providing the respective initial tokens to the second computer, generate respective first timestamps for the respective control paths. The first computer can be further programmed to, upon receiving the respective signatures from the second computer, generate respective second timestamps for the respective control paths. The first computer can be further programmed to determine respective control durations for the respective control paths based on the respective first timestamps for the respective control paths and the respective second timestamps for the respective control paths. The first computer can be further programmed to, based on the respective control durations for the respective control paths being less than or equal to respective control thresholds for the respective control paths, permit the second computer to operate, via the respective control paths, the object.

The first computer can be further programmed to, based on the respective control duration for one of the respective control paths being greater than a respective control threshold for the one of the respective control paths, actuate an object component to stop operation of the object.

The respective sequences can include respective initial tasks, respective intermediate tasks, and respective terminal tasks.

The system can include the second computer, including a second processor and a second memory storing instructions executable by the second processor such that the second computer is programmed to, upon receiving the respective initial tokens from the first computer, generate respective first intermediary tokens based on the respective initial tokens and the respective keys of the respective initial tasks in the respective control paths. The second computer can be further programmed to generate respective second intermediary tokens based on the respective first intermediary tokens and the respective key of the respective intermediate tasks in the respective control paths. The second computer can be further programmed to generate the respective signatures of the respective control paths based on the respective second intermediary tokens and the respective key of the respective terminal tasks in the respective control paths. The second computer can be further programmed to provide the respective signatures to the first computer.

The first computer can be further programmed to, upon providing the respective initial tokens to the second computer, generate respective first intermediary tokens based on the respective initial tokens and the respective keys of the respective initial tasks in the respective control paths. The first computer can be further programmed to generate respective second intermediary tokens based on the respective first intermediary tokens and the respective key of the respective intermediate tasks in the respective control paths. The first computer can be further programmed to generate the respective expected signatures of the respective control paths based on the respective second intermediary tokens and the respective key of the respective terminal tasks in the respective control paths. The first computer can be further programmed to determine whether to permit the second computer to operate the object based on a comparison between the respective expected signatures and the respective signatures.

The system can include the second computer, including a second processor and a second memory storing instructions executable by the second processor such that the second computer is programmed to provide the respective sequences and respective keys for each of the plurality of tasks in the respective control paths to the first computer.

The first computer can be further programmed to increment a counter based on the respective expected signature of one of the respective control paths differing from the respective signature of the one of the respective control paths. The first computer can be further programmed to permit operation of the object by the second computer based on the counter being less than a threshold prior to expiration of a timer. The first computer can be further programmed to reset the timer and the counter based on the counter being less than the threshold upon expiration of the timer. The first computer can be further programmed to actuate an object component to stop operation of the object based on the counter reaching the threshold prior to expiration of the timer.

The object may be a vehicle.

A method includes generating, via a first computer, respective initial tokens for respective instantiations of respective control paths. The respective control paths include a plurality of tasks arranged in respective sequences. The method further includes generating, via the first computer, respective expected signatures of the respective control paths based on the respective initial tokens, the respective sequences, and respective keys for each of the plurality of tasks in the respective control paths. The method further includes, upon receiving, from a second computer, respective signatures of the respective control paths, permitting the second computer to operate, via the respective control paths, an object based on the respective expected signatures matching the respective signatures.

The method can further include actuating, via the first computer, an object component to stop operation of the object based on the respective expected signature of one of the respective control paths differing from the respective signature of the one of the respective control paths.

The method can further include, upon providing the respective initial tokens to the second computer, generating, via the first computer, respective first timestamps for the respective control paths. The method can further include, upon receiving the respective signatures from the second computer, generating, via the first computer, respective second timestamps for the respective control paths. The method can further include determining, via the first computer, respective control durations for the respective control paths based on the respective first timestamps for the respective control paths and the respective second timestamps for the respective control paths. The method can further include, based on the respective control durations for the respective control paths being less than or equal to respective thresholds for the respective control paths, permitting, via the first computer, the second computer to operate, via the respective control paths, the object.

The method can further include, based on the respective control duration for one of the respective control paths being greater than a respective threshold for the one of the respective control paths, actuating, via the first computer, an object component to stop operation of the object.

The respective sequences can include respective initial tasks, respective intermediate tasks, and respective terminal tasks.

The method can further include, upon receiving the respective initial tokens from the first computer, generating, via the second computer, respective first intermediary tokens based on the respective initial tokens and the respective keys of the respective initial tasks in the respective control paths. The method can further include generating, via the second computer, respective second intermediary tokens based on the respective first intermediary tokens and the respective key of the respective intermediate tasks in the respective control paths. The method can further include generating, via the second computer, the respective signatures of the respective control paths based on the respective second intermediary tokens and the respective key of the respective terminal tasks in the respective control paths. The method can further include providing, via the second computer, the respective signatures to the first computer.

The method can further include, upon providing the respective initial tokens to the second computer, generating, via the first computer, respective first intermediary tokens based on the respective initial tokens and the respective keys of the respective initial tasks in the respective control paths. The method can further include generating, via the first computer, respective second intermediary tokens based on the respective first intermediary tokens and the respective key of the respective intermediate tasks in the respective control paths. The method can further include generating, via the first computer, the respective expected signatures of the respective control paths based on the respective second intermediary tokens and the respective key of the respective terminal tasks in the respective control paths. The method can further include determining whether to permit the second computer to operate the object based on a comparison between the respective expected signatures and the respective signatures.

The method can further include incrementing, via the first computer, a counter based on the respective expected signature of one of the respective control paths differing from the respective signature of the one of the respective control paths. The method can further include permitting, via the first computer, operation of the object by the second computer based on the counter being less than a threshold prior to expiration of a timer.

Further disclosed herein is a computing device programmed to execute any of the above method steps. Yet further disclosed herein is a computer program product, including a computer readable medium storing instructions executable by a computer processor, to execute an of the above method steps.

As disclosed herein, a program flow monitor (PFM) can monitor respective control paths for respective user assist features to verify execution of the respective control paths according to a specified sequence and within a specified amount of time. Providing the PFM to monitor the respective control paths can allow for utilization of one ECU capable of executing a plurality of user assist features and of satisfying the performance specifications for the ECU, which can satisfy packaging constraints for the vehicle and reduce computational resources utilized to execute the user assist features according to performance specifications for the ECU.

With reference to FIGS. 1-2, an example vehicle control system 100 includes a vehicle 105. A PFM 128 in the vehicle 105 is programmed to generate respective initial tokens 235 for respective instantiations of respective control paths 201, 202, 203, 204. The respective control paths 201, 202, 203, 204 include a plurality of tasks 205, 210, 215 arranged in respective sequences. The PFM 128 is further programmed to generate respective expected signatures 232 of the respective control paths 201, 202, 203, 204 based on the respective initial tokens 235, the respective sequences, and respective keys for each of the plurality of tasks 205, 210, 215 in the respective control paths 201, 202, 203, 204. The PFM 128 is further programmed to, upon receiving, from an ECU 126, respective signatures 230 of the respective control paths 201, 202, 203, 204, permit the ECU 126 to operate, via the respective control paths 201, 202, 203, 204, a vehicle 105 based on the respective expected signatures 232 matching the respective signatures 230.

Turning now to FIG. 1, the vehicle 105 includes a vehicle computer 110, sensors 115, actuators 120 to actuate various vehicle components 125, and a vehicle communications module 130. The vehicle computer 110 receives data from sensors 115. The communications module 130 allows the vehicle computer 110 to communicate with a remote server computer 140, and/or other vehicles (e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135).

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation (e.g., an ASIC for processing sensor data and/or communicating the sensor data). In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming (e.g. stored in a memory electrically connected to the FPGA circuit). In some examples, a combination of processor(s), ASIC(s), and/or FPGA circuits may be included in the vehicle computer 110.

The vehicle computer 110 may include programming to operate one or more of vehicle 105 propulsion, steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to (e.g., via a vehicle communications network such as a communications bus as described further below) more than one processor (e.g., included in electronic controller units (ECUs) or the like included in the vehicle 105) for monitoring and/or controlling various vehicle components 125 (e.g., a transmission controller, a steering controller, etc.). The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices (e.g., sensors 115, an actuator 120, ECUs, etc.). Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115 (e.g. front view, side view, etc.) providing images from an area surrounding the vehicle 105. In the context of this disclosure, an object is a physical (i.e., material) item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form (e.g., geo-coordinates such as latitude and longitude coordinates obtained via a navigation system, as is known, that uses the Global Positioning System (GPS)). Additionally, or alternatively, the data can include a location of an object (e.g., a vehicle, a sign, a tree, etc.) relative to the vehicle 105. As one example, the data may be image data of the environment around the vehicle 105. In such an example, the image data may include one or more objects and/or markings (e.g., lane markings) on or along a road. Image data herein means digital image data (e.g., comprising pixels with intensity and color values) that can be acquired by camera sensors 115. The sensors 115 can be mounted to any suitable location in or on the vehicle 105 (e.g., on a vehicle 105 bumper, on a top of a vehicle 105, etc.) to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including propulsion and steering of a vehicle 105.

In the context of the present disclosure, a vehicle component 125 is one or more hardware components adapted to perform a mechanical or electro-mechanical function or operation-such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a park assist component, an adaptive cruise control component, an adaptive steering component, etc.

The vehicle 105 can include an ECU 126 communicatively coupled via a network, typically on a vehicle communications bus or network. The ECU 126 can be a conventional computing device (i.e., including one or more processors and one or more memories) programmed to provide operations such as disclosed herein. For example, the ECU 126 can be programmed to operate the vehicle 105 based on a plurality of user assist features. The ECU 126 can be accessed via the vehicle communication network.

The vehicle 105 includes a PFM 128 communicatively coupled via the vehicle communication network. The PFM 128 is a computing module that includes a processor and a memory such as are known. The memory includes one or more forms of computer-readable media, and stores instructions executable by the PFM 128 for performing various operations, including as disclosed herein. For example, the PFM 128 can be programmed to monitor operations of the ECU 126 and/or to control various vehicle components 125. The PFM 128 can be accessed via the vehicle communication network.

The PFM 128 can further include two or more computing devices operating in concert to carry out operations including as described herein. Further, the PFM 128 can be a generic computer with a processor and memory as described above, and/or may include an ECU or electronic controller or the like for a specific function or set of functions, and/or may include a dedicated electronic circuit including an ASIC that is manufactured for a particular operation (e.g., an ASIC for processing sensor data and/or communicating the sensor data). In another example, the PFM 128 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC, as discussed above in regards to the vehicle computer 110. In some examples, a combination of processor(s), ASIC(s), and/or FPGA circuits may be included in the PFM 128.

In addition, the vehicle computer 110 may be configured for communicating via a vehicle-to-vehicle communication module 130 or interface with devices outside of the vehicle 105 (e.g., through a vehicle-to-vehicle (V2V) or vehicle-to-infrastructure (V2X) wireless communications (cellular and/or short-range radio communications, etc.) to another vehicle, and/or to a remote server computer 140 (typically via direct radio frequency communications)). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), cellular V2X (CV2X), and/or wide area networks (WAN), including the Internet, providing data communication services. The label "V2X" is used herein for communications that may be vehicle-to-vehicle (V2V) and/or vehicle-to-infrastructure (V2I), and that may be provided by communication module 130 according to any suitable short-range communications mechanism (e.g., DSRC, cellular, or the like).

The network 135 represents one or more mechanisms by which a vehicle computer 110 may communicate with remote computing devices (e.g., the remote server computer 140, another vehicle computer, etc.). Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device (i.e., including one or more processors and one or more memories) programmed to provide operations such as disclosed herein. Further, the remote server computer 140 can be accessed via the network 135 (e.g., the Internet, a cellular network, and/or or some other wide area network).

Figure 2A:
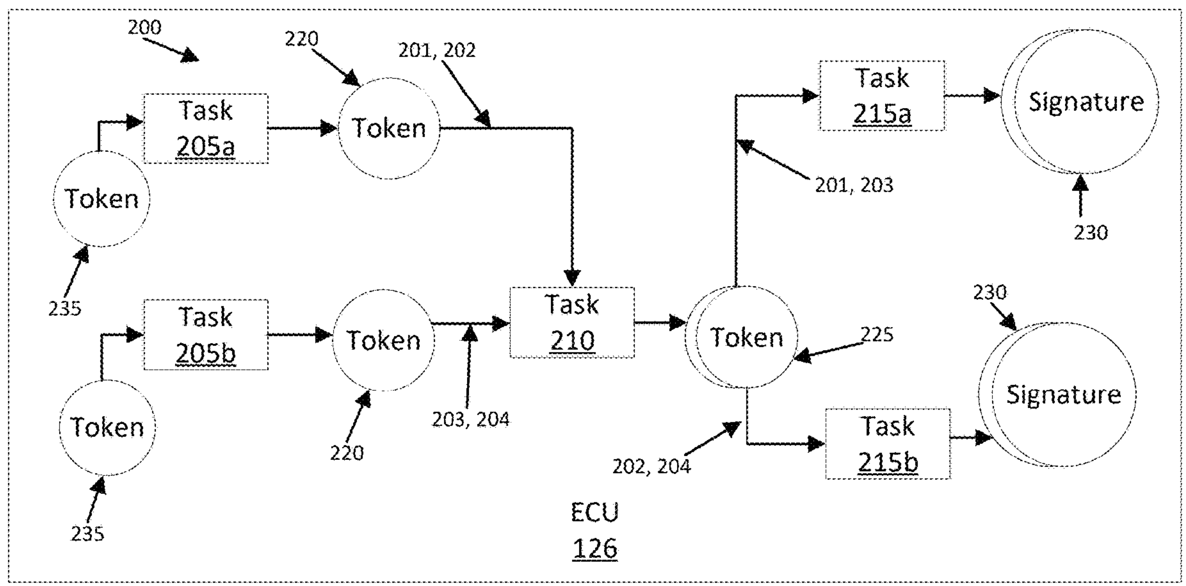
FIGS. 2A-2C are block diagrams illustrating an example control path system.
Figure 2B:
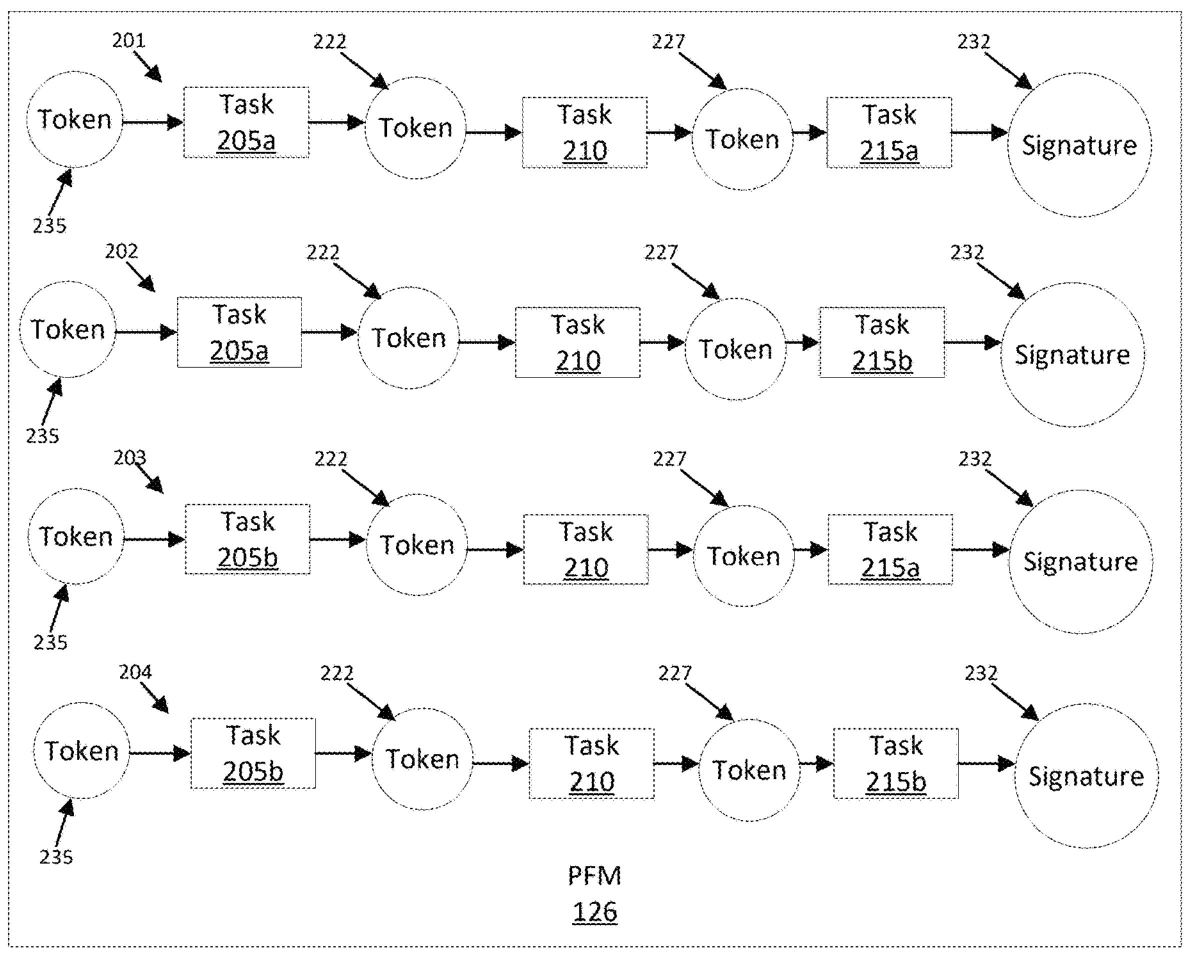
Figure 2C:
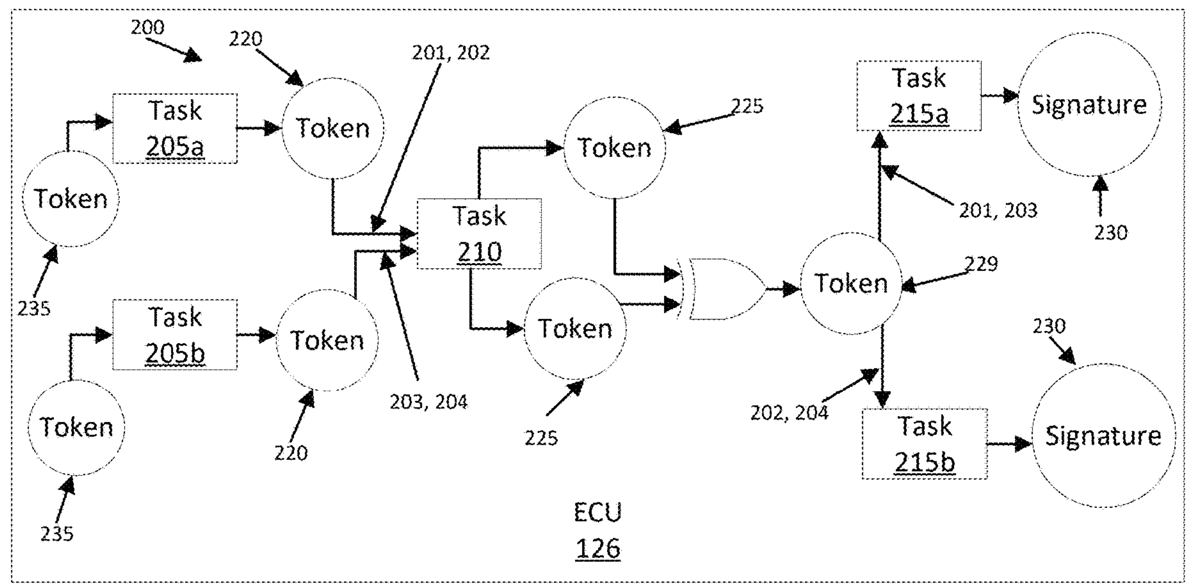

FIGS. 2A-2C (collectively referred to as "FIG. 2") are block diagrams illustrating an exemplary control path system 200 that includes exemplary respective control paths. As used herein, a "control path" is a sequence of tasks for executing an operation (e.g., a user assist feature). As used here, a "task" is a smallest sequence of instructions that can be assigned computational resources for completion. The exemplary respective control paths include a first control path 201 includes initial task 205*a*, intermediate task 210, and terminal task 215*a*; a second control path 202 includes initial task 205*a*, intermediate task 210, and terminal task 215*b*; a third control path 203 includes initial task 205*b*, intermediate task 210, and terminal task 215*a*; and a fourth control path 204 includes initial task 205*b*, intermediate task 210, and terminal task 215*b*. Two instantiations (i.e., initial tasks 205*a*, 205*b*) and four control paths are shown in FIG. 2 for ease of illustration, but the PFM system 200 could and likely would include tens, hundreds, or thousands of instantiations and control paths.

The ECU 126 may be programmed to operate the vehicle 105 via respective user assist features. To operate the vehicle 105 via the respective user assist features, the ECU 126 executes respective control paths 201, 202, 203, 204 including a plurality of tasks 205, 210, 215 arranged in respective sequences. Each control path includes an initial task 205, at least one intermediate task 210, and a terminal task 215. The respective sequences specify an order in which tasks in the respective control paths 201, 202, 203, 204 are required to be completed within respective control thresholds (as discussed below) to execute the respective user assist feature. The ECU 126 may store (e.g., in a memory thereof) the respective sequences of the respective control paths.

Each task 205, 210, 205 may be included in one or more control paths. For example, one task 210 may be an intermediate task in two or more control paths 201, 202, 203, 204. As another example, one task 205*a* may be an initial task in two or more control paths 201, 202. As yet another example, one task 205*b* may be a terminal task in two or more control paths 203, 204. Each task 205, 210, 215 includes a respective key. A key, as used herein, is a cryptographic key as utilized in symmetric key encryption. The ECU 126 may store (e.g., in a memory thereof) the plurality of tasks 205, 210, 215, including the respective keys.

The ECU 126 may be programmed to provide control path information to the PFM 128 (e.g., via the vehicle communications network). The control path information includes the respective sequences of the respective control paths 201, 202, 203, 204 and the respective keys of each task 205, 210, 215 included in the respective sequences. The control path information may further include a number of instantiations for the respective control paths 201, 202, 203, 204. For example, the ECU 126 can determine the number of instantiations based on the respective initial tasks 205 in the respective control paths 201, 202, 203, 204. As an example, the ECU 126 can compare the respective initial tasks 205*a*, 205*b* to each other, and can increment a counter based on determining that one respective initial task 205*a* does not match (i.e., has a different sequence of instructions than) another respective initial task 205*b*. That is, a number of instantiations matches a number of unique initial tasks 205 in the respective control paths 201, 202, 203, 204. The ECU 126 can then provide the incremented counter to the PFM 128 to indicate the number of instantiations for the respective control paths 201, 202, 203, 204.

The ECU 126 is programmed to receive respective initial tokens 235 from the PFM 128 (e.g., via the vehicle network). A "token" is a type of data associated with a control path. A token may be numeric data, a data string (e.g., including alpha numeric characters, or any other suitable type of data. For example, the ECU 126 can receive a message that specifies the respective initial tokens 235 and associates the respective initial tokens 235 with the respective control paths 201, 202, 203, 204. The ECU 126 receives one initial token 235 for respective instantiations of the respective control paths 201, 202, 203, 204. For the example control system 200 shown in FIG. 2, the ECU 126 receives two initial tokens 235 (i.e., one initial token 235 for the initial task 205*a* and another initial token 235 for the initial task 205*b*).

For each of the respective control paths 201, 202, 203, 204, the ECU 126 is programmed to complete the respective tasks 205, 210, 215 in the respective sequence. For example, the ECU 126 executes the respective instructions of the respective initial tasks 205. The ECU 126 is then programmed to generate respective first intermediary tokens 220 based on the respective initial tokens 235. To generate the respective first intermediary tokens 220, the ECU 126 encrypts the respective initial tokens 235 with the respective keys of the respective initial tasks 205 (e.g., according to known symmetric key encryption techniques). The ECU 126 then provides the respective first intermediary tokens 220 to the respective intermediate tasks 210 that follow the respective initial tasks 205 in the respective sequences.

After completion of the respective initial tasks 205, the ECU 126 executes the instructions of the respective intermediate tasks 210. The ECU 126 is then programmed to generate respective second intermediary tokens 225 based on the respective first intermediary tokens 220. To generate the respective second intermediary tokens 225, the ECU 126 encrypts the respective first intermediary tokens 220 with the respective keys of the respective intermediate tasks 210 (e.g., according to known symmetric key encryption techniques).

The ECU 126 can, for example, then provide the respective second intermediary tokens 225 to respective tasks that follow the respective intermediate tasks 210 in the respective sequences. The respective tasks that follow the respective intermediate tasks 210 can be subsequent intermediate tasks (not shown) or terminal tasks 215. In the situation in which the respective tasks that follow the respective intermediate tasks 210 are subsequent intermediate tasks, the ECU 126 can generate respective subsequent (e.g., third, fourth, fifth, etc.) intermediary tokens (not shown) for the respective subsequent intermediate tasks in the respective control paths 201, 202, 203, 204 in this manner.

Alternatively, after generation of the respective second intermediary tokens 225, the ECU 126 can merge the respective second intermediary tokens to generate one intermediary token 229. In such an example, the ECU 126 could merge the respective second intermediary tokens 225 according to known deterministic algorithms (e.g., an XOR algorithm). A deterministic algorithm is an algorithm that, given a particular input, produces the same output. The ECU 126 can generate one intermediary token 229 after executing the instructions of one or more intermediate tasks 210. Generating one intermediary token 229 in this manner can reduce a number of tokens managed by the ECU 126.

After completion of the respective intermediate tasks 210 in the respective control paths 201, 202, 203, 204, the ECU 126 provides the respective second (or subsequent) intermediary tokens 225 to the respective terminal tasks 215. The ECU 126 is programmed to execute the instructions of the respective terminal tasks 215. The ECU 126 is then programmed to generate respective signatures 230 of the respective control paths 201, 202, 203, 204 based on the respective second (or subsequent) intermediary tokens 225. To generate the respective signatures 230, the ECU 126 encrypts the respective second (or subsequent) intermediary tokens 225 with the respective keys of the respective terminal tasks 215 (e.g., according to known symmetric key encryption techniques). The ECU 126 then provides the respective signatures 230 to the PFM 128 (e.g., via the vehicle communications network).

Upon completion of the respective terminal tasks 215 in the respective sequence of the respective control paths 201, 202, 203, 204, the ECU 126 may be programmed to operate the vehicle 105 based at least partially on the user assist features. Said differently, the ECU 126 can actuate one or more vehicle components 125 to adjust operation of the vehicle 105 based data about the environment around the vehicle 105. The ECU 126 may initiate one or more user assist features to aid or supplement the user in operating the vehicle 105. As another example, the ECU 126 may initiate one or more user assist features to operate the vehicle 105 without user input.

The PFM 128 may be programmed to receive (e.g., via the vehicle communications network) the control path information (i.e., the respective sequences of the respective control paths 201, 202, 203, 204 and the respective keys for each of the plurality of tasks 205, 210, 215 in the respective sequences) from the ECU 126. The PFM 128 can store the control path information (e.g., in a memory of the PFM 128). The control path information may include a number of instantiations of the respective control paths 201, 202, 203, 204, as discussed above. As another example, the PFM 128 may determine a number of instantiations based on the respective sequences of the respective control paths 201, 202, 203, 204. In such an example, the PFM 128 can compare the respective initial tasks 205 of the respective control paths 201, 202, 203, 204 to each other. Upon determining that one respective initial task 205*a* does not match (i.e., has a different sequence of instructions than) another respective initial task 205*b*, the PFM 128 can increment a counter. The PFM 128 can determine the number of instantiations of the respective control paths 201, 202, 203, 204 is the same as the counter value.

The PFM 128 is programmed to generate the respective initial tokens 235 for the respective instantiations of the respective control paths 201, 202, 203, 204. That is, the PFM 128 generates one respective initial token 235 for each initial task 205 that does not match another initial task 205. The PFM 128 can generate the respective initial tokens 235 based on output from a random number generator. A "random number generator" is an algorithm that generates a sequence of numbers when seeded with an initial value. That is, the random number generator (RNG) is a deterministic algorithm that generates a specified sequence for each initial seed number; a random number generator in examples herein can be what is understood as a "pseudo-random number generator," i.e., a number generator that generates a sequence of numbers based on an initial seed number. Said differently, the PFM 128 can generate a sequence of random (or pseudorandom) numbers based on an initial seed number by using the RNG. The RNG can be a conventional algorithm, e.g., a Lehmer generator, a Mersenne Twister, an Advanced Randomization System, Philox, etc. In this document, "seed" has its conventional meaning in the computer arts, i.e., in the present context, to "seed" means specifying an initial condition of the RNG algorithm, which initializes the random number generator to generate a specific sequence of numbers based on the specific initial condition, i.e., seed value.

To generate the respective initial tokens 235, the PFM 128 can input a current time into the random number generator as the seed value. The PFM 128 can store (e.g., in a memory thereof), the respective initial tokens 235 for the respective control paths 201, 202, 203, 204. The PFM 128 can provide the respective initial tokens 235 to the ECU 126 (e.g., via the vehicle communications network). Additionally, the PFM 128 can generate respective first timestamps upon providing the respective initial tokens 235. That is, upon providing the respective initial tokens 235, the PFM 128 can store (e.g., in a memory thereof) respective current times at which the respective initial tokens 235 are provided to the ECU 126. The respective first timestamps may be a same or different current time for the respective initial tokens 235. For example, the PFM 128 can provide the respective initial tokens 235 at respective times. As another example, the PFM 128 can provide one or more respective initial tokens 235 at a same time.

For each of the respective control paths 201, 202, 203, 204, the PFM 128 may be programmed to generate respective expected first intermediary tokens 222 based on the respective initial tokens 235. To generate the respective expected first intermediary tokens 222, the PFM 128 encrypts the respective initial tokens 235 with the respective keys of the respective initial tasks 205 (e.g., according to the same encryption technique as the ECU 126 utilizes to generate the respective first intermediary tokens 220). The PFM 128 then provides the respective expected first intermediary tokens 222 to the respective intermediate tasks 210 that follow the respective initial tasks 205 in the respective sequences.

After completion of the respective initial tasks 205, the PFM 128 may be programmed to generate respective expected second intermediary tokens 227 based on the respective expected first intermediary tokens 222. To generate the respective expected second intermediary tokens 227, the PFM 128 encrypts the respective expected first intermediary tokens 222 with the respective keys of the respective intermediate tasks 210 (e.g., according to the same encryption technique as the ECU 126 utilizes to generate the respective second intermediary tokens 225). The PFM 128 then provides the respective expected second intermediary tokens 227 to respective tasks that follow the respective intermediate tasks 210 in the respective sequences. The PFM 128 can generate respective expected subsequent (e.g., third, fourth, fifth, etc.) intermediary tokens for each respective intermediate task 210 in the respective control path 201, 202, 203, 204 in this manner.

After completion of the respective intermediate tasks 210 in the respective control paths 201, 202, 203, 204, the PFM 128 provides the respective expected second (or subsequent) intermediary tokens 227 to the respective terminal tasks 215. The PFM 128 is then programmed to generate respective expected signatures 232 of the respective control paths 201, 202, 203, 204 based on the respective expected second (or subsequent) intermediary tokens 227. To generate the respective expected signatures 232, the PFM 128 encrypts the respective expected second (or subsequent) intermediary tokens 227 with the respective keys of the respective terminal tasks 215 (e.g., according to the same encryption technique as the ECU 126 utilizes to generate the respective signatures 230). The PFM 128 can then store (e.g., in a memory thereof) the respective expected signatures 232.

The PFM 128 is programmed to receive, from the ECU 126, the respective signatures 230 of the respective control paths 201, 202, 203, 204. Upon receiving the respective signatures 230, the PFM 128 can generate respective second timestamps. That is, the PFM 128 can store (e.g., in a memory thereof) respective current times at which the respective signatures 230 are received. The respective second timestamps may be a same or different current time for the respective signatures 230. For example, the PFM 128 can receive the respective signatures 230 at respective times. As another example, the PFM 128 can receive one or more respective signatures 230 at a same time.

For each of the respective control paths 201, 202, 203, 204, the PFM 128 is programmed to compare the respective signatures 230 to the respective expected signatures 232. If the respective signatures 230 match the respective expected signatures 232, then the PFM 128 determines that the ECU 126 executed the plurality of tasks 205, 210, 215 of the respective control paths 201, 202, 203, 204, in the respective sequences. If at least one of the respective signatures 230 does not match the at least one respective expected signature 232, then the PFM 128 determines that the ECU 126 did not execute the plurality of tasks 205, 210, 215 of the at least one respective control path 201, 202, 203, 204 in the respective sequence.

Additionally, for each of the respective control paths 201, 202, 203, 204, the PFM 128 may be programmed to determine whether the respective control durations are within respective control thresholds. To determine the respective control durations, the PFM 128 determines respective differences between the respective first timestamps and the respective second timestamps of the respective control paths 201, 202, 203, 204. That is, the PFM 128 determines an amount of time between providing the respective initial tokens 230 and receiving the respective signatures 230 of the respective control paths 201, 202, 203, 204. If the respective control durations are within the respective control thresholds, then the PFM 128 determines that the ECU 126 executed the respective control paths 201, 202, 203, 204 within available computational resources. If at least one of the respective control durations is not within the respective control threshold, then the PFM 128 determines that the ECU 126 did not execute the respective control paths 201, 202, 203, 204 within available computational resources.

The respective control threshold specifies respective maximum amounts of time within which the ECU 126 can complete the respective control paths 201, 202, 203, 204 to execute the respective user assist features. The respective control thresholds can be determined empirically (e.g., based on determining respective maximum amounts of time within which each of the respective control paths can be executed given a maximum amount of time available to execute each of the respective control paths due to available computational resources). The PFM 128 may store (e.g., in a memory thereof) the respective control thresholds.

The PFM 128 is programmed to determine whether to permit the ECU 126 to operate the vehicle 105 based on the user assist features. If the ECU 126 executes the respective control paths 201, 202, 203, 204 in the respective sequences and within the respective control durations, then the PFM 128 permits the ECU 126 to operate the vehicle 105 based on the user assist features. If the ECU 126 does not execute at least one of the respective control paths 201, 202, 203, 204 in the respective sequence or within the respective control duration, then the PFM 128 determines whether to stop operation of the vehicle 105.

To determine whether to stop operation of the vehicle 105, the PFM 128 may be programmed to initiate a timer (e.g., based on the vehicle 105 being transitioned from an OFF state to an ON state, a user assist feature being initiated, etc.) A duration of the timer is a predetermined time, e.g., 500 milliseconds, 1 second, 5 seconds, etc. The duration of the timer may be stored, e.g., in the memory of the PFM 128.

Upon determining that the ECU 126 does not execute at least one of the respective control paths 201, 202, 203, 204 in the respective sequence or within the respective control duration, the PFM 128 may increment a counter. The counter may be stored (e.g., in a memory of the PFM 128). The PFM 128 may compare the counter to a threshold. The threshold may be stored (e.g., in a memory of the PFM 128). The threshold may be determined empirically (e.g., based on determining a maximum number of instances that the ECU 126 may not execute at least one respective control path 201, 202, 203, 204 based on the respective sequence or within the respective control duration prior to expiration of the timer while satisfying performance specifications for the ECU 126). If the counter is less than or equal to the threshold prior to expiration of the timer, then the PFM 128 can continue to permit the ECU 126 to operate the vehicle 105 based on the user assist features. If the counter is less than or equal to the threshold upon expiration of the timer, then the PFM 128 can reset the counter (e.g., to a value of 0) and the timer. If the counter is greater than the threshold prior to expiration of the timer, then the PFM 128 can determine to stop operation of the vehicle 105.

To stop operation of the vehicle 105, the PFM 128 can, for example, actuate one or more vehicle components 125 (e.g., a brake component, a propulsion component, a steering component, etc.) to stop the vehicle 105. Additionally, the PFM 128 may output an alert message (e.g., actuate an human-machine interface to provide a visual, audio, and/or haptic output) indicating that the ECU 126 did not execute at least one of the respective control paths 201, 202, 203, 204 in the respective sequence or within the respective control duration.

Figure 3:
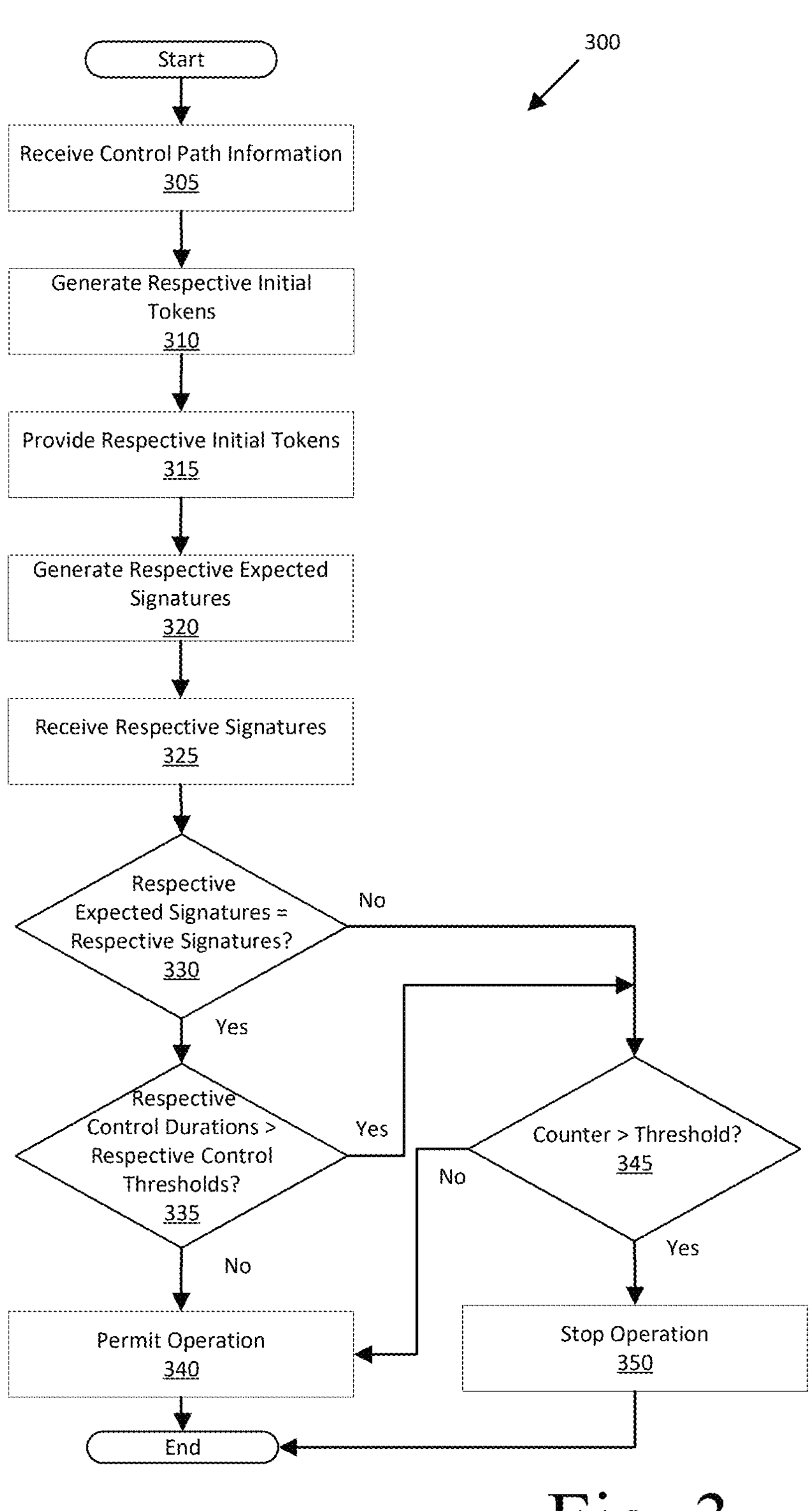
FIG. 3 is an example flowchart of an example process for monitoring a control path system.

FIG. 3 is a diagram of an example process 300 for monitoring a control path system 200. The process 300 begins in a block 305. The process 300 can be carried out by a PFM 128 included in a vehicle 105 executing program instructions stored in a memory thereof.

In the block 305, the PFM 128 receives control path information from an ECU 126 (e.g., via a vehicle communications network). The control path information specifies respective sequences of respective control paths 201, 202, 203, 204 and respective keys of a plurality of tasks 205, 210, 215 included in the respective sequences, as discussed above. The control path information may include a number of instantiations of the respective control paths 201, 202, 203, 204, as discussed above. The process 300 continues in a block 310.

In the block 310, the PFM 128 generates respective initial tokens 235 for the respective instantiations of the respective control paths 201, 202, 203, 204. The PFM 128 can, for example, generate the respective initial tokens 235 based on seeding a RNG with a current time, as discussed above. The process 300 continues in a block 315.

In the block 315, the PFM 128 provides the respective initial tokens 235 to the ECU 126 (e.g., via the vehicle communications network). Additionally, the PFM 128 can generate respective first timestamps upon providing the respective initial tokens 235, as discussed above. The process 300 continues in a block 320.

In the block 320, the PFM 128 generates respective expected signatures 232 of the respective control paths 201, 202, 203, 204. As discussed above, the PFM 128 may be programmed to generate the respective expected signatures based on encrypting, according to the respective sequences of the respective control paths 201, 202, 203, 204, the respective initial tokens 235 with the respective keys of the plurality of tasks 205, 210, 215 included in the respect control paths 201, 202, 203, 204. The process 300 continues in a block 325.

In the block 325, the PFM 128 receives the respective signatures 230 of the respective control paths 201, 202, 203, 204 from the ECU 126 (e.g., via the vehicle communications network). Additionally, upon receiving the respective signatures, the PFM 128 can generate respective second timestamps, as discussed above. The process 300 continues in a block 330.

In the block 330, for each of the respective control paths 201, 202, 203, 204, the PFM 128 compares the respective signatures 230 to the respective expected signatures 232 of the respective control paths. If the respective signatures 230 match the respective expected signatures 232, then the process 300 continues in a block 335. If at least one of the respective signatures 230 does not match the at least one of the respective expected signatures 232, then the process 300 continues in a block 345.

In the block 335, the PFM 128 determines whether the respective control durations are within respective control thresholds. The PFM 128 can determine the respective control durations based on respective differences between the respective first timestamps and the respective second timestamps. If the respective control durations are within the respective the control thresholds, then the process 300 continues in a block 340. If at least one of the respective control durations is outside of the at least one respective control threshold, then the process 300 continues in the block 345.

In the block 340, the PFM 128 permits the ECU 126 to operate the vehicle 105 based on user assist features. The process 300 may end following the block 340. Alternatively, the process 300 may return to the block 310 and continue (e.g., while the vehicle 105 remains in an ON state).

In the block 345, the PFM 128 increments a counter. The PFM 128 can compare the counter to a threshold. If the counter is less than or equal to the threshold prior to expiration of a timer, then the process 300 continues in the block 340. The PFM 128 can reset the timer based on the counter being less than or equal to the threshold upon expiration of the timer, as discussed above. The PFM 128 can, for example, initiate the timer based on the vehicle 105 being transitioned from an OFF state to an ON state. As another example, the PFM 128 can initiate the timer upon initiation of one or more user assist features (e.g., based on receiving a user input via a human-machine interface (HMI)). If the counter is greater than the threshold value prior to expiration of the timer, then the process 300 continues in the block 350.

In the block 350, the PFM 128 stops the ECU 126 from operating the vehicle 105 based on the user assist features. For example, the PFM 128 may actuate one or more vehicle components 125 to stop the vehicle 105, as discussed above. The process 300 ends following the block 350.

Figure 4:
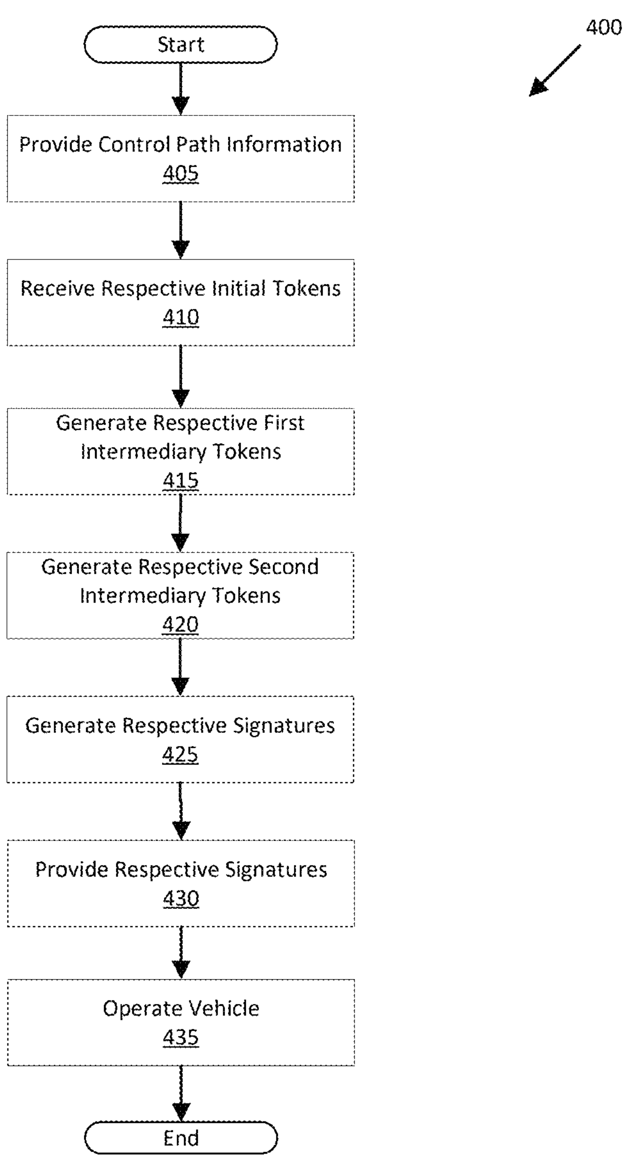
FIG. 4 is an example flowchart of an example process for executing the control path system.

FIG. 4 is a diagram of an example process 400 for executing the control path system 200. The process 400 begins in a block 405. The process 400 can be carried out by the ECU 126 included in the vehicle 105 executing program instructions stored in a memory thereof.

In the block 405, the ECU 126 provides the control path information to the PFM 128 (e.g., via the vehicle communications network), as discussed above. The process 400 continues in a block 410.

In the block 410, the ECU 126 receives the respective initial tokens 235 from the PFM 128 (e.g., via the vehicle communications network), as discussed above. The process 400 continues in a block 415.

In the block 415, the ECU 126 generates respective first intermediary tokens 220. For example, the ECU 126 can execute the respective initial tasks 205 of the respective control paths 201, 202, 203, 204. The ECU 126 then encrypts the respective initial tokens 220 with the respective keys of the respective initial tasks 205 to generate the respective first intermediary tokens 220, as discussed above. The ECU 126 then provides the respective first intermediary tokens 220 to the respective intermediate tasks 210 that follow the respective initial tasks 205 in the respective sequences. The process 400 continues in a block 420.

In the block 420, the ECU 126 generates respective second intermediary tokens 225. For example, the ECU 126 can execute the respective intermediate tasks 210 of the respective control paths 201, 202, 203, 204. The ECU 126 then encrypts the respective first intermediary tokens 220 with the respective keys of the respective intermediate tasks 210 to generate the respective second intermediary tokens 225, as discussed above. The ECU 126 then provides the respective second intermediary tokens 225 to respective terminal tasks 215. Alternatively, the ECU 126 may provide the respective second intermediary tasks 225 to subsequent intermediate tasks. The process 400 may include additional blocks to execute subsequent intermediate tasks of respective sequences and to generate subsequent intermediary tokens of the respective subsequent tasks in this manner. The process 400 continues in a block 425.

In the block 425, the ECU 126 generates respective signatures 230. For example, the ECU 126 can execute the respective terminal tasks 215 of the respective control paths 201, 202, 203, 204. The ECU 126 then encrypts the respective second intermediary tokens 225 with the respective keys of the respective terminal tasks 215 to generate the respective signatures 230, as discussed above. The process 400 continues in a block 430.

In the block 430, the ECU 126 then provides the respective signatures 230 to the PFM 128 (e.g., via the vehicle communications network). The process 400 continues in a block 435.

In the block 435, the ECU 126 operates the vehicle 105 based on the user assist features. The ECU 126 may be overridden by the PFM 128 (e.g., based on the ECU 126 not executing at least one of the respective control paths 201, 202, 203, 204 in the respective sequence or within the respective control duration). In this situation, the PFM 128 stops the ECU 126 from operating the vehicle 105 based on the user assist features. The process 400 ends following the block 435. Alternatively, the process 400 may return to the block 410 (e.g., while the vehicle 105 is in an ON state and based on the ECU 126 executing the respective control paths 201, 202, 203, 204 in the respective sequences and within the respective control durations).

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions (e.g., from a memory, a computer readable medium, etc.) and executes these instructions, thereby performing one or more processes, including one or more of the processes described herein.

Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:

a first computer including a processor and a memory, the memory storing instructions executable by the processor such that the first computer is programmed to:

generate respective initial tokens for respective instantiations of respective control paths, wherein the respective control paths include a plurality of tasks arranged in respective sequences;

generate respective expected signatures of the respective control paths based on the respective initial tokens, the respective sequences, and respective keys for each of the plurality of tasks in the respective control paths; and upon receiving, from a second computer, respective signatures of the respective control paths, permit the second computer to operate, via the respective control paths, an object based on the respective expected signatures matching the respective signatures.

2. The system of claim 1, wherein the first computer is further programmed to actuate an object component to stop operation of the object based on the respective expected signature of one of the respective control paths differing from the respective signature of the one of the respective control paths.

3. The system of claim 1, wherein the first computer is further programmed to:

upon providing the respective initial tokens to the second computer, generate respective first timestamps for the respective control paths;

upon receiving the respective signatures from the second computer, generate respective second timestamps for the respective control paths;

determine respective control durations for the respective control paths based on the respective first timestamps for the respective control paths and the respective second timestamps for the respective control paths; and based on the respective control durations for the respective control paths being less than or equal to respective control thresholds for the respective control paths, permit the second computer to operate, via the respective control paths, the object.

4. The system of claim 3, wherein the first computer is further programmed to, based on the respective control duration for one of the respective control paths being greater than a respective control threshold for the one of the respective control paths, actuate an object component to stop operation of the object.

5. The system of claim 1, wherein the respective sequences include respective initial tasks, respective intermediate tasks, and respective terminal tasks.

6. The system of claim 5, further comprising the second computer, including a second processor and a second memory storing instructions executable by the second processor such that the second computer is programmed to:

upon receiving the respective initial tokens from the first computer, generate respective first intermediary tokens based on the respective initial tokens and the respective keys of the respective initial tasks in the respective control paths;

generate respective second intermediary tokens based on the respective first intermediary tokens and the respective key of the respective intermediate tasks in the respective control paths;

generate the respective signatures of the respective control paths based on the respective second intermediary tokens and the respective key of the respective terminal tasks in the respective control paths; and provide the respective signatures to the first computer.

7. The system of claim 5, wherein the first computer is further programmed to:

upon providing the respective initial tokens to the second computer, generate respective first intermediary tokens based on the respective initial tokens and the respective keys of the respective initial tasks in the respective control paths;

generate respective second intermediary tokens based on the respective first intermediary tokens and the respective key of the respective intermediate tasks in the respective control paths;

generate the respective expected signatures of the respective control paths based on the respective second intermediary tokens and the respective key of the respective terminal tasks in the respective control paths; and determine whether to permit the second computer to operate the object based on a comparison between the respective expected signatures and the respective signatures.

8. The system of claim 1, further comprising the second computer, including a second processor and a second memory storing instructions executable by the second processor such that the second computer is programmed to provide the respective sequences and respective keys for each of the plurality of tasks in the respective control paths to the first computer.

9. The system of claim 1, wherein the first computer is further programmed to:

increment a counter based on the respective expected signature of one of the respective control paths differing from the respective signature of the one of the respective control paths; and permit operation of the object by the second computer based on the counter being less than a threshold prior to expiration of a timer.

10. The system of claim 9, wherein the first computer is further programmed to reset the timer and the counter based on the counter being less than the threshold upon expiration of the timer.

11. The system of claim 9, wherein the first computer is further programmed to actuate an object component to stop operation of the object based on the counter reaching the threshold prior to expiration of the timer.

12. The system of claim 1, wherein the object is a vehicle.

13. A method, comprising:

generating, via a first computer, respective initial tokens for respective instantiations of respective control paths, wherein the respective control paths include a plurality of tasks arranged in respective sequences;

generating, via the first computer, respective expected signatures of the respective control paths based on the respective initial tokens, the respective sequences, and respective keys for each of the plurality of tasks in the respective control paths; and upon receiving, from a second computer, respective signatures of the respective control paths, permitting the second computer to operate, via the respective control paths, an object based on the respective expected signatures matching the respective signatures.

14. The method of claim 13, further comprising actuating, via the first computer, an object component to stop operation of the object based on the respective expected signature of one of the respective control paths differing from the respective signature of the one of the respective control paths.

15. The method of claim 13, further comprising:

upon providing the respective initial tokens to the second computer, generating, via the first computer, respective first timestamps for the respective control paths;

upon receiving the respective signatures from the second computer, generating, via the first computer, respective second timestamps for the respective control paths;

determining, via the first computer, respective control durations for the respective control paths based on the respective first timestamps for the respective control paths and the respective second timestamps for the respective control paths; and based on the respective control durations for the respective control paths being less than or equal to respective thresholds for the respective control paths, permitting, via the first computer, the second computer to operate, via the respective control paths, the object.

16. The method of claim 15, further comprising based on the respective control duration for one of the respective control paths being greater than a respective threshold for the one of the respective control paths, actuating, via the first computer, an object component to stop operation of the object.

17. The method of claim 13, wherein the respective sequences include respective initial tasks, respective intermediate tasks, and respective terminal tasks.

18. The method of claim 17, further comprising:

upon receiving the respective initial tokens from the first computer, generating, via the second computer, respective first intermediary tokens based on the respective initial tokens and the respective keys of the respective initial tasks in the respective control paths;

generating, via the second computer, respective second intermediary tokens based on the respective first intermediary tokens and the respective key of the respective intermediate tasks in the respective control paths;

generating, via the second computer, the respective signatures of the respective control paths based on the respective second intermediary tokens and the respective key of the respective terminal tasks in the respective control paths; and providing, via the second computer, the respective signatures to the first computer.

19. The method of claim 17, further comprising:

upon providing the respective initial tokens to the second computer, generating, via the first computer, respective first intermediary tokens based on the respective initial tokens and the respective keys of the respective initial tasks in the respective control paths;

generating, via the first computer, respective second intermediary tokens based on the respective first intermediary tokens and the respective key of the respective intermediate tasks in the respective control paths;

generating, via the first computer, the respective expected signatures of the respective control paths based on the respective second intermediary tokens and the respective key of the respective terminal tasks in the respective control paths; and determining whether to permit the second computer to operate the object based on a comparison between the respective expected signatures and the respective signatures.

20. The method of claim 13, further comprising:

incrementing, via the first computer, a counter based on the respective expected signature of one of the respective control paths differing from the respective signature of the one of the respective control paths; and permitting, via the first computer, operation of the object by the second computer based on the counter being less than a threshold prior to expiration of a timer.

* * * * *